United States Patent
Takeda et al.

(10) Patent No.: US 8,808,821 B2
(45) Date of Patent: Aug. 19, 2014

(54) MATERIAL ROLL AND METHOD FOR MANUFACTURING MATERIAL ROLL

(75) Inventors: Kentarou Takeda, Ibaraki (JP); Michihito Ooishi, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 12/990,908

(22) PCT Filed: Jan. 25, 2010

(86) PCT No.: PCT/JP2010/050874
§ 371 (c)(1),
(2), (4) Date: Nov. 3, 2010

(87) PCT Pub. No.: WO2010/092867
PCT Pub. Date: Aug. 19, 2010

(65) Prior Publication Data
US 2011/0059327 A1    Mar. 10, 2011

(30) Foreign Application Priority Data

Feb. 16, 2009   (JP) .................. 2009-032874

(51) Int. Cl.
| | |
|---|---|
| *B32B 7/00* | (2006.01) |
| *B32B 7/04* | (2006.01) |
| *B32B 7/06* | (2006.01) |
| *B32B 7/12* | (2006.01) |
| *B32B 27/08* | (2006.01) |
| *B32B 27/36* | (2006.01) |
| *B32B 37/00* | (2006.01) |
| *B32B 37/12* | (2006.01) |
| *B32B 37/18* | (2006.01) |
| *B32B 37/20* | (2006.01) |
| *B32B 38/00* | (2006.01) |
| *B32B 38/10* | (2006.01) |
| *B65H 18/00* | (2006.01) |
| *B65H 18/28* | (2006.01) |

(52) U.S. Cl.
USPC ......... 428/41.7; 428/40.1; 428/212; 428/480; 156/184; 156/230; 156/247; 156/249; 156/297; 156/299; 427/162; 427/163.1; 427/402; 427/407.1; 427/412.1; 427/412.5

(58) Field of Classification Search
None
See application file for complete search history.

(56) References Cited

U.S. PATENT DOCUMENTS 5,968,657 A * 10/1999 Scullin et al. .............. 428/423.1
6,459,514 B2 * 10/2002 Gilbert et al. ................. 359/15
(Continued)

FOREIGN PATENT DOCUMENTS

| CN | 101220246 A | 7/2008 |
|---|---|---|
| CN | 101265394 A | 9/2008 |

(Continued)

OTHER PUBLICATIONS

International Search Report of PCT/JP2010/050874, mailing date May 11, 2010.

(Continued)

*Primary Examiner* — Vivian Chen
(74) *Attorney, Agent, or Firm* — Westerman, Hattori, Daniels & Adrian, LLP

(57) ABSTRACT

Provided are a material roll and a method for manufacturing the material roll in which lifting between base films and an optical film is hardly generated. Provided is a material roll (R), wherein a first base film (F12), a first pressure-sensitive adhesive layer (F14), an optical film (F11), a second pressure-sensitive adhesive layer (F15) and a second base film (F13) are wounded together in a manner that said layers are laminated in said order from outer side. An adhesive power A of the first pressure-sensitive adhesive layer (F14) at an interface on the first base film (F12) side, an adhesive power B of the first pressure-sensitive adhesive layer (F14) at an interface on the optical film (F11) side, an adhesive power C of the second pressure-sensitive adhesive layer (F15) at an interface on the optical film (F11) side, and an adhesive power D of the second pressure-sensitive adhesive layer (F15) at an interface on the second base film (F13) side satisfy the relationships A<B and A<C<D. Lifting between base films (F12, F13) and optical film (F11) can be made unlikely to generate by winding the optical film (F11) in a manner that the second base film (F13), that has greater adhesive power is in an inside.

6 Claims, 2 Drawing Sheets

(56) References Cited

U.S. PATENT DOCUMENTS

| | | | |
|---|---|---|---|
| 6,582,789 B1 * | 6/2003 | Sumi | 428/40.1 |
| 6,613,433 B2 * | 9/2003 | Yamamoto et al. | 428/411.1 |
| 7,270,877 B2 * | 9/2007 | Niino et al. | 428/354 |
| 7,279,060 B2 * | 10/2007 | Chen et al. | 156/230 |
| 7,462,663 B2 * | 12/2008 | Kim et al. | 524/262 |
| 7,658,992 B2 * | 2/2010 | Satake et al. | 428/341 |
| 7,662,456 B2 * | 2/2010 | Bell | 428/40.1 |
| 7,842,363 B2 * | 11/2010 | Truog et al. | 428/40.1 |
| 2004/0005136 A1 * | 1/2004 | Okumura | 385/147 |
| 2005/0128613 A1 | 6/2005 | Maida et al. | |
| 2006/0225827 A1 * | 10/2006 | Lei et al. | 156/64 |
| 2006/0228592 A1 | 10/2006 | Stover et al. | |
| 2007/0202297 A1 | 8/2007 | Takada et al. | |
| 2007/0231548 A1 | 10/2007 | Merrill et al. | |
| 2008/0166513 A1 | 7/2008 | Ikeda et al. | |
| 2008/0220196 A1 | 9/2008 | Ukei et al. | |
| 2009/0159175 A1 | 6/2009 | Nakahira et al. | |
| 2009/0258176 A1 | 10/2009 | Muta et al. | |

FOREIGN PATENT DOCUMENTS

| | | | |
|---|---|---|---|
| JP | 55-117110 | * | 9/1980 |
| JP | 2001-108981 | * | 4/2001 |
| JP | 2001-108981 A | | 4/2001 |
| JP | 2001-108982 | * | 4/2001 |
| JP | 2001-108982 A | | 4/2001 |
| JP | 2002-019039 | * | 1/2002 |
| JP | 2002-019039 A | | 1/2002 |
| JP | 2002-303730 | * | 10/2002 |
| JP | 2002-303730 A | | 10/2002 |
| JP | 2003-025473 | * | 1/2003 |
| JP | 2003-025473 A | | 1/2003 |
| JP | 2005-338367 A | | 12/2005 |
| JP | 2006-143961 A | | 6/2006 |
| JP | 2007-140046 A | | 6/2007 |
| TW | 200619021 A | | 6/2006 |
| TW | I259141 A | | 8/2006 |
| TW | 200810924 A | | 3/2008 |
| WO | 2007/115137 A2 | | 10/2007 |
| WO | 2008/004503 A1 | | 1/2008 |
| WO | 2008/078960 A1 | | 7/2008 |

OTHER PUBLICATIONS

Supplementary European Search Report dated Mar. 23, 2011, issued in corresponding European Patent Application No. 10741147.2.

Tawainese Office Action dated Jan. 31, 2011, issued in corresponding Tawainese Patent Application No. 099103826.

Notification of Transmittal Translation of the International Preliminary Report on Patentability of International Application No. PCT/JP2010/050874 mailed Sep. 22, 2011 with Forms PCT/IB/373 amd PCT/ISA/237.

Chinese Notice of Allowance dated Jan. 13, 2014, issued in corresponding Chinese Patent Application No. 201080001681.3, w/English translation, (8 pages).

Chinese Office Action dated Jun. 26, 2013, issued in corresponding Chinese Patent Application No. 201080001681.3, with English translation (5 pages).

Chinese Office Action dated Jan. 5, 2013, issued in corresponding Chinese Patent Application No. 201080001681.3, with English translation (18 pages).

* cited by examiner

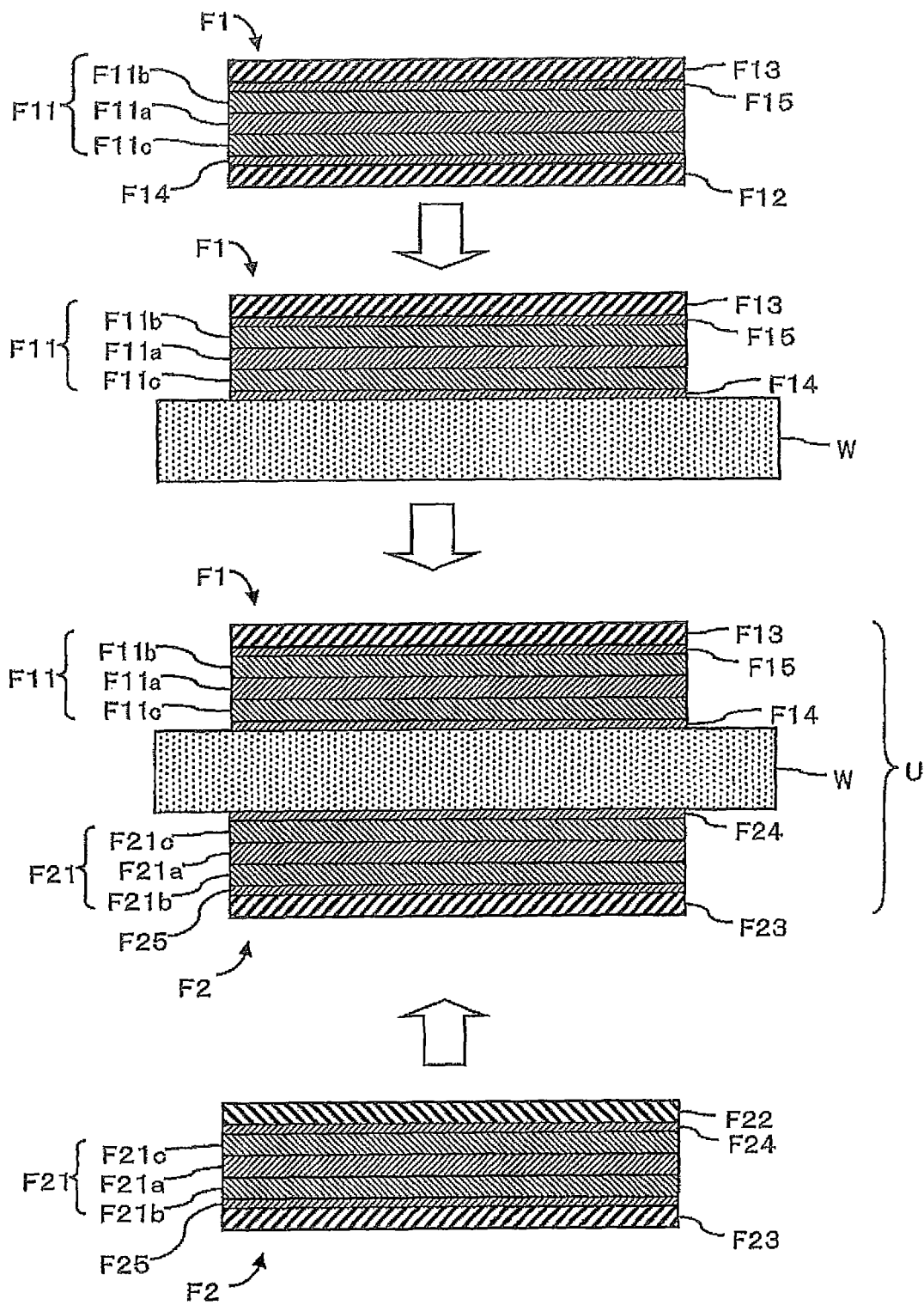

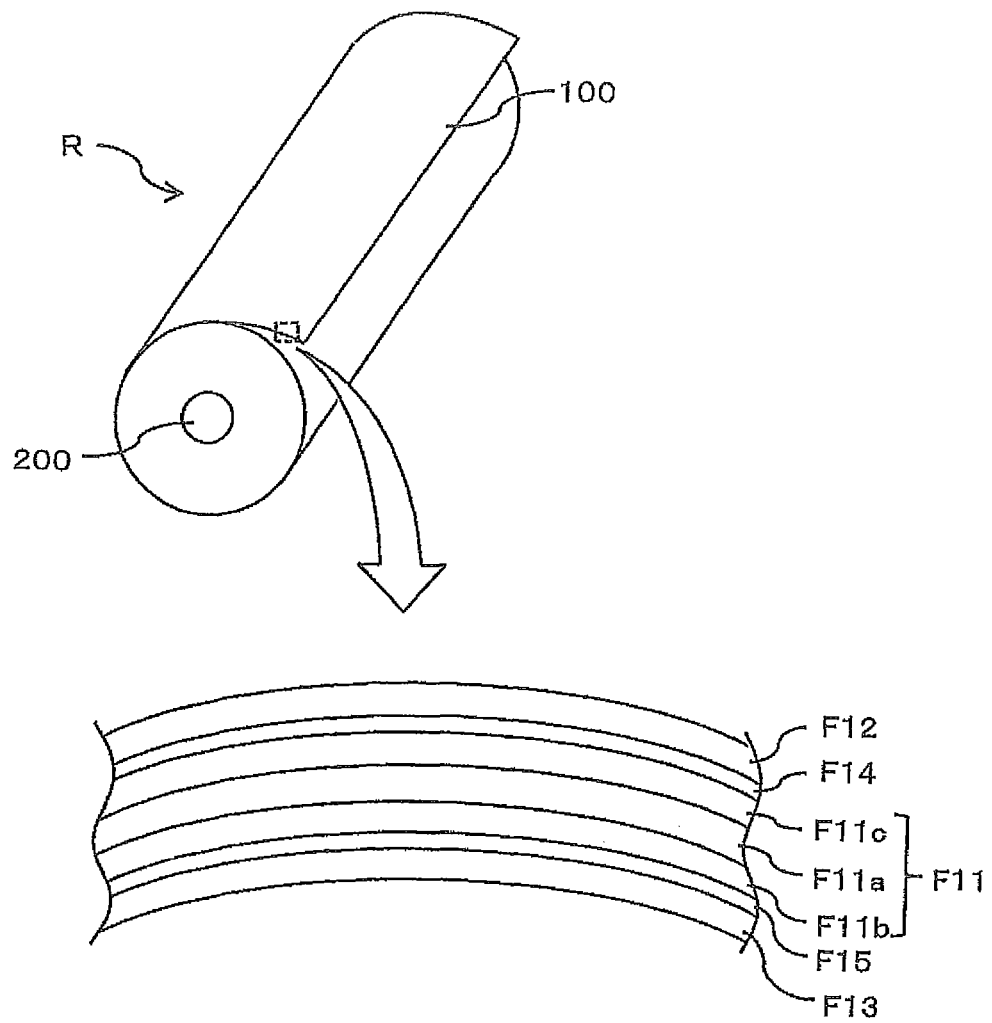

MATERIAL ROLL AND METHOD FOR MANUFACTURING MATERIAL ROLL

TECHNICAL FIELD

The present invention relates to a material roll made by winding a long optical film having a first base film disposed on a first surface with a first pressure-sensitive adhesive layer interposed therebetween and having a second base film disposed on a second surface with a second pressure-sensitive adhesive layer interposed therebetween, as well as to a method for manufacturing the material roll.

BACKGROUND ART

As an example of optical display units mounted on liquid crystal display devices or the like, there is an optical display unit having a structure such that an optical sheet piece including an optical film such as a polarizing film is bonded onto one surface or both surfaces of a display substrate. Conventionally, as a method for manufacturing such an optical display unit, there is known a method including a step of manufacturing pieces of sheet material by feeding a sheet material from a material roll made by winding the sheet material in which a release film (first base film) is bonded onto a long optical sheet including an optical film, and sequentially cutting the sheet material along the width direction at an interval that corresponds to the size of the display substrate. Then, by peeling the first base film from the produced piece of sheet material, an optical sheet piece having a first pressure-sensitive adhesive layer on the surface is obtained, and the optical sheet piece is bonded onto the display substrate with the first pressure-sensitive adhesive layer interposed therebetween. As described above, the first base film is peeled off at the time of bonding the optical sheet piece to the display substrate, thereby providing a composition that can be peeled off in a comparatively easy manner.

Typically, by a conventional method of manufacturing an optical display unit as described above, pieces of sheet material produced by a film maker are packaged and transported to a panel processing manufacturer, and are subjected to unpacking and bonded to each display substrate by the panel processing manufacturer. The above packaging work is a necessary work because the film maker and the panel processing manufacturer are located at different positions; however, the work is cumbersome and also raises a problem in that scratches or contaminations are likely to generate in the pieces of sheet material at the time of transportation or the like.

In contrast, according to a technique disclosed in Japanese Unexamined Patent Publication No. 2007-140046 (Patent Document 1), a step of feeding a long sheet material from a material roll and cutting the sheet material and a step of bonding the cut piece of sheet material onto a display substrate are performed on a continuous production line. Accordingly, as compared with a conventional method in which the pieces of sheet material are packaged, the operation can be facilitated and the scratches or contaminations which may generate at the time of transportation or the like can be suppressed.

PRIOR ART DOCUMENTS

Patent Documents

Patent Document 1: Japanese Unexamined Patent Publication No. 2007-140046

SUMMARY OF THE INVENTION

Problems to be Solved by the Invention

Even with such a technique as disclosed in Patent Document 1 described above, there is a need to transport a material roll, in which a long sheet material is wound, from a film maker to a panel processing manufacturer. An optical film such as a polarizing film included in the long optical sheet is treated as being defective even when a slight scratch or contamination is generated. Therefore, a surface protecting film is bonded to the optical film for the purpose of preventing a scratch or contamination from being generated on the optical film during the transportation or until the completion of bonding to the display substrate that is carried out thereafter.

The above surface protecting film is a second base film that is bonded, in a peelable manner, onto the surface of the optical film with a second pressure-sensitive adhesive layer interposed therebetween. After the optical sheet piece is bonded to the display substrate, the surface protecting film is peeled off together with the second pressure-sensitive adhesive layer from the optical film. In this embodiment, since the second base film is peeled off from the optical film after the optical sheet piece is bonded onto the display substrate, the second pressure-sensitive adhesive layer is made to be capable of being peeled off from the optical film in a comparatively easy manner.

As described above, the first base film and the second base film are made to have a composition that can be peeled off from the optical film in a comparatively easy manner. In the case where a material roll is formed by winding a long sheet material in which such first and second base films that can be easily peeled off are laminated, a shear may be generated between these films by a stress exerted between each base film and the optical film. In such a case, lifting is generated between each base film and the optical film, to causes air bubbles or creases.

When air bubbles or creases are generated between each base film and the optical film, there is a problem in that the material roll becomes defective due to generation of scratches on the surface of the optical film or on the surface of the pressure-sensitive adhesive layer. In particular, at the time of, for example, transporting the material roll, there are cases where the material roll is exposed to a high-temperature environment for a long period of time. In such a case, lifting is likely to be generated between each base film and the optical film, thereby raising a problem in that the durability of the material roll decreases.

The present invention has been made in view of the above circumstances, and an object thereof is to provide a material roll and a method for manufacturing the material roll in which lifting is hardly generated between the base film and the optical film. Moreover, an object of the present invention is to provide a material roll and a method for manufacturing the material roll that can improve the durability in a high-temperature environment.

Means for Solving the Problems

The inventors have made studies on the problems as described above, and found out that the lifting between the films can be suppressed when a relationship between the adhesive power of the pressure-sensitive adhesive layer that is interposed between the base film and the optical film and the direction of winding the films are controlled.

A material roll according to a first aspect of the present invention is a material roll made by winding a long optical film having a first base film disposed on a first surface with a first pressure-sensitive adhesive layer interposed therebetween and having a second base film disposed on a second surface with a second pressure-sensitive adhesive layer interposed therebetween, wherein an adhesive power A of the first pressure-sensitive adhesive layer at an interface on the first base film side, an adhesive power B of the first pressure-sensitive adhesive layer at an interface on the optical film side, an adhesive power C of the second pressure-sensitive adhesive layer at an interface on the optical film side, and an adhesive power D of the second pressure-sensitive adhesive layer at an interface on the second base film side satisfy the relationships A<B and A<C<D, and that the optical film is wound so that the first base film is on an outer side and the second base film is in an inner side.

According to such an embodiment, it is possible to provide a material roll in which a first base film, a first pressure-sensitive adhesive layer, an optical film, a second pressure-sensitive adhesive layer, and a second base film are wound so as to be laminated in this order from the outside. In such a material roll, a stress is exerted in a shrinking direction on the part located in the inside, and a stress is exerted in an elongating direction on the part located on the outside. Therefore, lifting is hardly generated at the interface between the first base film and the first pressure-sensitive adhesive layer where the stress is exerted in the elongating direction, but lifting is likely to be generated at the interface between the first pressure-sensitive adhesive layer and the optical film where the stress is exerted in a shrinking direction. As in the present invention, however, it is possible to make the lifting be hardly generated between the first base film and the optical film by setting the adhesive power B of the first pressure-sensitive adhesive layer at the interface on the optical film side to be larger than the adhesive power A of the first pressure-sensitive adhesive layer at the interface on the first base film side.

Moreover, in a high-temperature environment, each layer itself of the first base film, the first pressure-sensitive adhesive layer, the optical film, the second pressure-sensitive adhesive layer, and the second base film shrinks, so that a larger stress is exerted in the shrinking direction on the second base film located in the inside, whereby lifting is more likely to be generated between the second base film and the optical film. Ss in the present invention, however, it is possible to make the lifting be hardly generated between the second base film and the optical film by setting the adhesive power C, D of the second pressure-sensitive adhesive layer to be larger than the adhesive power A of the first pressure-sensitive adhesive layer at the interface on the first base film side and winding the optical film so that the second base film side having the larger adhesive power is in the inside, to thereby improve the durability in a high-temperature environment.

A material roll according to a second aspect of the present invention is characterized in that at least one of the first base film and the second base film is made of a polyester-based polymer.

According to such an embodiment, at least one of the first base film and the second base film can be formed of a polyester-based polymer that is preferable in view of the cost, handling property, transparency, and the like. In particular, the polyester-based polymer is more suitable as a material for the first base film or the second base film in view of the fact that the defects (so-called fish eyes), generated when undissolved substances or the deteriorated substances of the material is taken into the film, are hardly generated.

A material roll according to a third aspect of the present invention is characterized in that the polyester-based polymer is polyethylene terephthalate.

According to such an embodiment, at least one of the first base film and the second base film can be formed of polyethylene terephthalate that is preferable in view of the cost, handling property, and the like.

A material roll according to a fourth aspect of the present invention is characterized in that the first base film and the second base film are made of the same material.

According to such an embodiment, it is possible to make lifting be hardly generated between the base films and the optical film and to improve the durability in a high-temperature environment in the material roll made by winding the optical film in which the first base film and the second base film made of the same material are disposed on the respective surfaces.

A method for manufacturing a material roll according to a fifth aspect of the present invention is a method for manufacturing a material roll by winding a long optical film, the optical film having a first base film disposed on a first surface with a first pressure-sensitive adhesive layer interposed therebetween and having a second base film disposed on a second surface with a second pressure-sensitive adhesive layer interposed therebetween, wherein an adhesive power A of the first pressure-sensitive adhesive layer at an interface on the first base film side, an adhesive power B of the first pressure-sensitive adhesive layer at an interface on the optical film side, an adhesive power C of the second pressure-sensitive adhesive layer at an interface on the optical film side, and an adhesive power D of the second pressure-sensitive adhesive layer at an interface on the second base film side satisfy the relationships A<B and A<C<D, and the material roll is manufactured by winding the optical film so that the first base film is on an outer side and the second base film is in an inner side.

According to such an embodiment, it is possible to provide a method for manufacturing a material roll achieving the same effect as the material roll according to the first aspect of the present invention.

Effects of the Invention

According to the present invention, it is possible to make lifting be hardly generated between the base films and the optical film and to improve the durability in a high-temperature environment by setting the adhesive power B of the first pressure-sensitive adhesive layer at the interface on the optical film side to be larger than the adhesive power A of the first pressure-sensitive adhesive layer at the interface on the first base film side and by setting the adhesive power C, D of the second pressure-sensitive adhesive layer to be larger than the above adhesive power A and winding the optical film so that the second base film side having a larger adhesive power is in the inside.

BRIEF DESCRIPTION OF THE DRAWINGS

FIG. 1 is a schematic cross-sectional view illustrating an embodiment of manufacturing an optical display unit by bonding optical sheet pieces onto a display substrate.

FIG. 2 is a cross-sectional view illustrating a composition example of a first sheet material.

EMBODIMENTS OF THE INVENTION

FIG. 1 is a schematic cross-sectional view illustrating an embodiment of manufacturing an optical display unit U by bonding optical sheet pieces F1, F2 onto a display substrate W.

In this embodiment, the optical sheet piece F1 obtained by feeding a long optical sheet from a first material roll and cutting the optical sheet is bonded onto one surface of the display substrate W, and the optical sheet piece F2 created by feeding a long optical sheet from a second material roll and cutting the optical sheet is bonded onto the other surface of the display substrate W, whereby an optical display unit U is manufactured. However, the present invention is not limited to such an embodiment, and an embodiment in which the optical sheet piece is bonded only to one surface of the display substrate W may be adopted.

(Display Substrate)

Examples of the display substrate W may include a glass substrate unit of a liquid crystal cell, and an organic EL light-emitting unit. The display substrate W is formed to have, for example, a rectangular shape.

(Optical Sheet Piece)

Examples of the optical sheet piece F1, F2 may include a laminated film including at least one of a polarizing film, a retardation film, and a brightness enhancement film. The optical sheet piece F1, F2 has, on one surface thereof, a first pressure-sensitive adhesive layer F14, F24 that forms a surface of bonding to the display substrate W, and a first base film F12, F22 is bonded to the first pressure-sensitive adhesive layer F14, F24. In bonding the optical sheet piece F1, F2 to the display substrate W, the first base film F12, F22 is peeled off from the optical sheet piece F1, F2 and the first pressure-sensitive adhesive layer F14, F24 is left thereunto, so that the optical sheet piece F1, F2 is bonded to the display substrate W with the first pressure-sensitive adhesive layer F14, F24 interposed therebetween.

In this example, the optical sheet piece F1 has an optical film F11 and a second base film F13. The optical film F11 includes, for example, a polarizer F11a, a first film F11b bonded to one surface thereof, and a second film F11c bonded to the other surface thereof.

The first base film F12 is a release film (a so-called separator) that is bonded to the first surface (the surface on the second film F11c side) of the optical film F11 with the first pressure-sensitive adhesive layer F14 interposed therebetween. The second base film F13 is a surface protecting film that is bonded to the second surface (the surface on the first film F11b side) of the optical film F11 with the second pressure-sensitive adhesive layer F15 interposed therebetween. After the optical sheet piece F1 is bonded to the display substrate W, the second base film F13 is peeled off together with the second pressure-sensitive adhesive layer F15 from the optical film F11. The first film F11b is a polarizer protecting film disposed for the purpose of preventing scratches, contamination or the like from being generated in the polarizer F11a. The second film F11c is a coating layer disposed for the purpose of close adhesion to the first pressure-sensitive adhesive layer F14 and protection of the polarizer.

However, the present invention is not limited to such an embodiment, and it is possible to employ an embodiment in which a second base film F13 other than a surface protecting film is bonded to the optical film F11. Moreover, the present invention is not limited to an embodiment in which the polarizer protecting film (first film F11b) is disposed only on one surface of the polarizer F11a, and an embodiment in which the polarizer protecting film is disposed on both surfaces of the polarizer F11a may be adopted.

Similarly, the optical sheet piece F2 has an optical film F21 and a second base film F23. The optical film F21 includes, for example, a polarizer F21a, a first film F21b bonded to one surface thereof, and a second film F21c bonded to the other surface thereof.

The first base film F22 is a release film (a so-called separator) that is bonded to the first surface (the surface on the second film F21c side) of the optical film F21 with the first pressure-sensitive adhesive layer F24 interposed therebetween. The second base film F23 is a surface protecting film that is bonded to the second surface (the surface on the first film F21b side) of the optical film F21 with the second pressure-sensitive adhesive layer F25 interposed therebetween. After the optical sheet piece F2 is bonded to the display substrate W, the second base film F23 is peeled off together with the second pressure-sensitive adhesive layer F25 from the optical film F21. The first film F21b is a polarizer protecting film disposed for the purpose of preventing scratches, contamination or the like from being generated in the polarizer F21a. The second film F21c is a coating layer disposed for the purpose of close adhesion to the first pressure-sensitive adhesive layer F24 and protection of the polarizer.

However, the present invention is not limited to such an embodiment, and an embodiment in which a second base film F23 other than a surface protecting film is bonded to the optical film F21 may be adopted. Moreover, the present invention is not limited to an embodiment in which the polarizer protecting film (first film F21b) is disposed only on one surface of the polarizer F21a, and an embodiment in which the polarizer protecting film is disposed on both surfaces of the polarizer F21a may be adopted.

In the present embodiment, the first material roll is manufactured by winding, in a roll form, the first sheet material having the first base film F12 disposed on the first surface of the long optical film F11 with the first pressure-sensitive adhesive layer F14 interposed therebetween and having the second base film F13 disposed on the second surface with the second pressure-sensitive adhesive layer F15 interposed therebetween. In addition, the second material roll is manufactured by winding, in a roll form, the second sheet material having the first base film F22 disposed on the first surface of the long optical film F21 with the first pressure-sensitive adhesive layer F24 interposed therebetween and having the second base film F23 disposed on the second surface with the second pressure-sensitive adhesive layer F25 interposed therebetween.

(Composition of Sheet Material)

FIG. 2 is a cross-sectional view illustrating a composition example of a first sheet material 100. In this example, the second sheet material is formed by laminating films in a manner similar to that of the first sheet material 100. Therefore, only a composition of the first sheet material 100 will be described.

As described above, the first sheet material 100 has a composition such that the first base film F12, the first pressure-sensitive adhesive layer F14, the optical film F11, the second pressure-sensitive adhesive layer F15, and the second base film F13 are laminated in this order. In this embodiment, a first material roll R is manufactured by winding the first sheet material 100 having the above composition around a core 200 so that the first base film F12 is on the outer side and the second base film F13 is in the inner side, as shown in FIG. 2.

The polarizer F11a may be made of a film polarizer (polyvinyl alcohol-based film), and is obtained, for example, by drying a polyvinyl alcohol (PVA) film subjected to dyeing, cross-linking, and stretching treatments. The first film F11b serving as a polarizer protecting film is made of, for example, TAC (triacetylcellulose) film, PET (polyethylene terephthalate) film, or the like. The second film F11c serving as a coating layer is preferably an adhesive containing, for example, polyvinyl alcohol, isocyanate, cyan acrylate, aziridine, or the like as a major component. The thickness of the optical film F11 is, for example, 40 to 205 μm.

The first base film F12 is made, for example, of a polyester-based polymer such as polyethylene terephthalate (PET). The thickness of the first base film F12 is, for example, 25 to 60 μm.

The second base film F13 is preferably made of the same material as the first base film F12 and is made, for example, of a polyester-based polymer such as polyethylene terephthalate (PET). The thickness of the second base film F13 is, for example, 25 to 60 μm.

The material for forming the first base film F12 and the second base film F13 is not limited to polyethylene terephthalate. In view of transparency, mechanical strength, thermal stability, shielding property against moisture, isotropicity, durability, productivity, and the like, it is possible to use, for example, a polyester-based polymer other than polyethylene terephthalate, such as polyethylene naphthalate, a cellulose-based polymer such as diacetylcellulose or triacetylcellulose, an acrylic-based polymer such as polymethyl methacrylate, a styrene-based polymer such as polystyrene, acrylonitrile, or styrene copolymer, a polycarbonate-based polymer, polyethylene, polypropylene, an olefin-based resin having a cyclic-based or norbornene structure, a vinyl chloride-based polymer, an amide-based polymer such as nylon or aromatic polyamide, an imide-based polymer, a sulfone-based polymer, a polyethersulfone-based polymer, a polyetheretherketone-based polymer, a polyphenylene sulfide-based polymer, a vinyl alcohol-based polymer, a vinylidene chloride-based polymer, a vinyl butyral-based polymer, an arylate-based polymer, a polyoxymethylene-based polymer, an epoxy-based polymer, a blended product of the above polymers, or the like.

However, in view of the cost, the handling property, and the transparency, the first base film F12 and the second base film F13 are preferably made of an olefin-based polymer or a polyester-based polymer. Further, in view of hardly generating the defects (so-called fish eyes) that are generated when the undissolved substance or the deteriorated substance of the material is taken into the film, the first base film F12 and the second base film F13 are preferably made of a polyester-based polymer. Moreover, in view of the cost, the handling property, or the like, the first base film F12 and the second base film F13 are preferably made of polyethylene terephthalate.

In the following, results of a lifting evaluation test on plural kinds of material rolls by checking the lifting of the first base film F12 and the second base film F13 against the optical film will be described. Each material roll used in the lifting evaluation test was obtained by bonding the first base film and the second base film on the first surface and the second surface of the optical film with the pressure-sensitive adhesive layers respectively having various adhesive powers disposed therebetween to manufacture a sheet material and winding the sheet material around the core. The lifting evaluation was carried out in respective environments of an ordinary-temperature environment (temperature of 25° C. and humidity of 55%) and a high-temperature environment (temperature of 60° C. and humidity of 30%). The results of the test are shown in the following Table 1.

TABLE 1

|  | Adhesive power A (N) | Adhesive power B (N) | Adhesive power C (N) | Adhesive power D (N) | Lifting evaluation 25° C., 55% | | Lifting evaluation 60° C., 30% | |
| --- | --- | --- | --- | --- | --- | --- | --- | --- |
|  |  |  |  |  | First base film | Second base film | First base film | Second base film |
| Example 1 | 0.15 | 17 | 0.4 | 5 | absent | absent | absent | absent |
| Comparative Example 1 | 0.15 | 17 | 0.12 | 5 | absent | absent | absent | present |
| Comparative Example 2 | 5 | 0.12 | 17 | 0.15 | present | present | present | present |
| Comparative Example 3 | 0.15 | 17 | 17 | 0.15 | absent | present | absent | present |
| Comparative Example 4 | 5 | 0.12 | 0.12 | 5 | present | absent | present | present |

Example 1

In Example 1, a sheet material was used in which a release liner "MRF38" (manufactured by Mitsubishi Resin Co., Ltd.) was bonded as a first base film on a pressure-sensitive adhesive layer (first pressure-sensitive adhesive layer) of a polarizing film "SEG1423" (manufactured by Nitto Denko Corporation) having the pressure-sensitive adhesive layer attached thereto and serving as an optical film, and a surface protecting film "RP-300" (manufactured by Nitto Denko Corporation) was bonded as a second base film on a surface opposite to the pressure-sensitive adhesive layer.

The first base film is made of polyethylene terephthalate and has a thickness of 38 μm. The second base film is a film also formed of polyethylene terephthalate in the same manner as the first base film and having a thickness of 38 μm and, on the bonding surface for bonding to the optical film, a pressure-sensitive adhesive layer (second pressure-sensitive adhesive layer) made of acrylic-based pressure-sensitive adhesive and having a thickness of 23 μm is formed. A long sheet material having such a composition and having a length of 400 m was wound around a core having an outer diameter of 6 inches so that the first base film is on the outer side and the second base film is in the inner side, so as to manufacture a material roll.

In Example 1, by 180° C. peel measurement of 25 mm width, the adhesive power A of the first pressure-sensitive adhesive layer at the interface on the first base film side was measured to be 0.15 N; the adhesive power B of the first pressure-sensitive adhesive layer at the interface on the optical film side was measured to be 17 N; the adhesive power C of the second pressure-sensitive adhesive layer at the interface on the optical film side was measured to be 0.4 N; and the adhesive power D of the second pressure-sensitive adhesive layer at the interface on the second base film side was measured to be 5 N. In other words, the above adhesive powers satisfy the relationships of A<B and A<C<D.

After the material roll having such a composition was held in an ordinary-temperature environment for one week, lifting between the first base film and the optical film and lifting between the second base film and the optical film were evaluated, whereby no lifting was observed in either of the two. Moreover, after the above material roll was held in a high-temperature environment for one week, lifting between the first base film and the optical film and lifting between the second base film and the optical film were evaluated, whereby no lifting was confirmed in either of the two.

Comparative Example 1

In Comparative Example 1, a sheet material was used in which a release liner "MRF38" (manufactured by Mitsubishi Resin Co., Ltd.) was bonded as a first base film on a pressure-sensitive adhesive layer (first pressure-sensitive adhesive layer) of a polarizing film "SEG1423" (manufactured by Nitto Denko Corporation) having the pressure-sensitive adhesive layer attached thereto and serving as an optical film, and a surface protecting film "AS3-305" (manufactured by Fujimori Kogyo Co., Ltd.) was bonded as a second base film on a surface opposite to the pressure-sensitive adhesive layer.

The first base film is made of polyethylene terephthalate and has a thickness of 38 μm. The second base film is a film also formed of polyethylene terephthalate in the same manner as the first base film and having a thickness of 38 μm and, on the bonding surface for bonding to the optical film, a pressure-sensitive adhesive layer (second pressure-sensitive adhesive layer) made of acrylic-based pressure-sensitive adhesive and having a thickness of 20 μm is formed. A long sheet material having such a composition and having a length of 400 m was wound around a core having an outer diameter of 6 inches so that the first base film is on the outer side and the second base film is in the inner side, so as to manufacture a material roll.

In Comparative Example 1, by 180° C. peel measurement of 25 mm width, the adhesive power A of the first pressure-sensitive adhesive layer at the interface on the first base film side was measured to be 0.15 N; the adhesive power B of the first pressure-sensitive adhesive layer at the interface on the optical film side was measured to be 17 N; the adhesive power C of the second pressure-sensitive adhesive layer at the interface on the optical film side was measured to be 0.12 N; and the adhesive power D of the second pressure-sensitive adhesive layer at the interface on the second base film side was measured to be 5 N. In other words, the above adhesive powers satisfy the relationships of A<B, C<D, and further A>C.

After the material roll having such a composition was held in an ordinary-temperature environment for one week, lifting between the first base film and the optical film and lifting between the second base film and the optical film were evaluated, whereby no lifting was confirmed in either of the two. However, after the above material roll was held in a high-temperature environment for one week, lifting between the first base film and the optical film and lifting between the second base film and the optical film were evaluated, whereby lifting was confirmed between the second base film and the optical film, although no lifting was confirmed between the first base film and the optical film.

Comparative Example 2

In Comparative Example 2, a sheet material was used in which a release liner "MRF38" (manufactured by Mitsubishi Resin Co., Ltd.) was bonded as a second base film on a pressure-sensitive adhesive layer (second pressure-sensitive adhesive layer) of a polarizing film "SEG1423" (manufactured by Nitto Denko Corporation) having the pressure-sensitive adhesive layer attached thereto and serving as an optical film, and a surface protecting film "AS3-305" (manufactured by Fujimori Kogyo Co., Ltd.) was bonded as a first base film on a surface opposite to the pressure-sensitive adhesive layer.

The second base film is made of polyethylene terephthalate and has a thickness of 38 μm. The first base film is a film also formed of polyethylene terephthalate in the same manner as the second base film and having a thickness of 38 μm and, on the bonding surface for bonding to the optical film, a pressure-sensitive adhesive layer (first pressure-sensitive adhesive layer) made of acrylic-based pressure-sensitive adhesive and having a thickness of 20 μm is formed. A long sheet material having such a composition and having a length of 400 m was wound around a core having an outer diameter of 6 inches so that the first base film is on the outer side and the second base film is in the inner side, so as to manufacture a material roll. In other words, the material roll in Comparative Example 2 and the material roll in Comparative Example 1 are the same in the composition of the sheet material; however, the front and the back are reversed in winding the sheet material.

In Comparative Example 2, by 180° C. peel measurement of 25 mm width, the adhesive power A of the first pressure-sensitive adhesive layer at the interface on the first base film side was measured to be 5 N; the adhesive power B of the first pressure-sensitive adhesive layer at the interface on the optical film side was measured to be 0.12 N; the adhesive power C of the second pressure-sensitive adhesive layer at the interface on the optical film side was measured to be 17 N; and the adhesive power D of the second pressure-sensitive adhesive layer at the interface on the second base film side was measured to be 0.15 N. In other words, the above adhesive powers satisfy the relationships of A>B and C>D.

After the material roll having such a composition was held in an ordinary-temperature environment for one week, lifting between the first base film and the optical film and lifting between the second base film and the optical film were evaluated, whereby lifting was confirmed in both of the two. Furthermore, after the above material roll was held in a high-temperature environment for one week, lifting between the first base film and the optical film and lifting between the second base film and the optical film were evaluated, whereby lifting was confirmed in both of the two.

Comparative Example 3

In Comparative Example 3, a sheet material was used in which, on both surfaces of a polarizing film "SEG5423" (manufactured by Nitto Denko Corporation) serving as an optical film, the pressure-sensitive adhesive layer in the polarizing film "SEG1423" (manufactured by Nitto Denko Corporation) having the pressure-sensitive adhesive layer attached thereto was respectively formed, and a release liner "MRF38" (manufactured by Mitsubishi Resin Co., Ltd.) was bonded on each pressure-sensitive adhesive layer.

One release liner "MRF38" is a first base film and is bonded to the optical film with the above pressure-sensitive adhesive layer (first pressure-sensitive adhesive layer) interposed therebetween. The other release liner "MRF38" is a second base film and is bonded to the optical film with the above pressure-sensitive adhesive layer (second pressure-sensitive adhesive layer) interposed therebetween. The first base film and the second base film are made of polyethylene terephthalate and have a thickness of 38 μm. A long sheet material having such a composition and having a length of 400 m was wound around a core having an outer diameter of 6 inches so that the first base film is on the outer side and the second base film is in the inner side, so as to manufacture a material roll.

In Comparative Example 3, by 180° C. peel measurement of 25 mm width, the adhesive power A of the first pressure-sensitive adhesive layer at the interface on the first base film side was measured to be 0.15 N; the adhesive power B of the first pressure-sensitive adhesive layer at the interface on the optical film side was measured to be 17 N; the adhesive power C of the second pressure-sensitive adhesive layer at the interface on the optical film side was measured to be 17 N; and the adhesive power D of the second pressure-sensitive adhesive layer at the interface on the second base film side was measured to be 0.15 N. In other words, the above adhesive powers satisfy the relationships of A<B and C>D.

After the material roll having such a composition was held in an ordinary-temperature environment for one week, lifting between the first base film and the optical film and lifting between the second base film and the optical film were evaluated, whereby lifting was confirmed between the second base film and the optical film, although no lifting was confirmed between the first base film and the optical film. In contrast, after the above material roll was held in a high-temperature environment for one week, lifting between the first base film and the optical film and lifting between the second base film and the optical film were evaluated, whereby lifting was confirmed between the second base film and the optical film, although no lifting was confirmed between the first base film and the optical film.

Comparative Example 4

In Comparative Example 4, a sheet material was used in which, on both surfaces of a polarizing film "SEG5423" (manufactured by Nitto Denko Corporation) serving as an optical film, a surface protecting film "AS3-305" (manufactured by Fujimori Kogyo Co., Ltd.) was bonded.

The surface protecting film "AS3-305" is a film formed of polyethylene terephthalate and having a thickness of 38 μm, wherein a pressure-sensitive adhesive layer made of an acrylic-based pressure-sensitive adhesive and having a thickness of 20 μm is formed on a bonding surface for bonding to the optical film. The film part of one surface protecting film "AS3-305" is a first base film and is bonded to the optical film with the pressure-sensitive adhesive layer (first pressure-sensitive adhesive layer) interposed therebetween. The film part of the other surface protecting film "AS3-305" is serving as a second base film and is bonded to the optical film with the pressure-sensitive adhesive layer (second pressure-sensitive adhesive layer) interposed therebetween. A long sheet material having such a composition and having a length of 400 m was wound around a core having an outer diameter of 6 inches so that the first base film is on the outer side and the second base film is in the inner side, so as to manufacture a material roll.

In Comparative Example 4, by 180° C. peel measurement of 25 mm width, the adhesive power A of the first pressure-sensitive adhesive layer at the interface on the first base film side was measured to be 5 N; the adhesive power B of the first pressure-sensitive adhesive layer at the interface on the optical film side was measured to be 0.12 N; the adhesive power C of the second pressure-sensitive adhesive layer at the interface on the optical film side was measured to be 0.12 N; and the adhesive power D of the second pressure-sensitive adhesive layer at the interface on the second base film side was measured to be 5 N. In other words, the above adhesive powers satisfy the relationships of A>B and C<D.

After the material roll having such a composition was held in an ordinary-temperature environment for one week, lifting between the first base film and the optical film and lifting between the second base film and the optical film were evaluated, whereby lifting was confirmed between the first base film and the optical film, although no lifting was confirmed between the second base film and the optical film. Furthermore, after the above material roll was held in a high-temperature environment for one week, lifting between the first base film and the optical film and lifting between the second base film and the optical film were evaluated, whereby lifting was confirmed in both of the two.

In a material roll in which a first base film, a first pressure-sensitive adhesive layer, an optical film, a second pressure-sensitive adhesive layer, and a second base film are wound so as to be laminated in this order from the outside as in Example 1 and Comparative Examples 1 to 4, a stress is exerted in a shrinking direction on the part located in the inside, and a stress is exerted in an longitudinal direction on the part located on the outside. Therefore, lifting is hardly generated at the interface between the first base film and the first pressure-sensitive adhesive layer where the stress acts in the longitudinal direction, but lifting is likely to be generated at the interface between the first pressure-sensitive adhesive layer and the optical film where the stress acts in the shrinking direction. However, it is possible to make the lifting be hardly generated between the first base film and the optical film by setting the adhesive power B of the first pressure-sensitive adhesive layer at the interface on the optical film side to be larger than the adhesive power A of the first pressure-sensitive adhesive layer at the interface on the first base film side as in Example 1.

Moreover, in a high-temperature environment, each layer itself of the first base film, the first pressure-sensitive adhesive layer, the optical film, the second pressure-sensitive adhesive layer, and the second base film shrinks, so that a larger stress is exerted in the shrinking direction on the second base film located in the inside, whereby lifting is more likely to be generated between the second base film and the optical film. However, it is possible to make the lifting be hardly generated between the second base film and the optical film thereby to improve the durability in a high-temperature environment by setting the adhesive power C, D of the second pressure-sensitive adhesive layer to be larger than the adhesive power A of the first pressure-sensitive adhesive layer at the interface on the first base film side as in Example 1 and winding the optical film so that the second base film side having the larger adhesive power is in the inside.

Here, the above adhesive powers A to D are preferably values such as the following within a range that satisfy the relationships of A<B and A<C<D. That is, it is preferable that the adhesive power A of the first pressure-sensitive adhesive layer at the interface on the first base film side is 0.05 to 0.3 N; the adhesive power B of the first pressure-sensitive adhesive layer at the interface on the optical film side is 10 to 30 N; the adhesive power C of the second pressure-sensitive adhesive layer at the interface on the optical film side is 0.3 to 1.5 N; and the adhesive power D of the second pressure-sensitive adhesive layer at the interface on the second base film side is 2 to 10 N.

In Example 1, the first base film and the second base film are formed of the same material (polyethylene terephthalate); however, the present invention is not limited to such a composition, and a composition in which the first base film and the second base film are formed of different materials may be employed.

DESCRIPTION OF REFERENCE NUMERALS

| | |
|---|---|
| F1 | optical sheet piece |
| F2 | optical sheet piece |
| F11 | optical film |
| F12 | first base film |
| F13 | second base film |
| F14 | first pressure-sensitive adhesive layer |
| F15 | second pressure-sensitive adhesive layer |
| F21 | optical film |
| F22 | first base film |
| F23 | second base film |
| F24 | first pressure-sensitive adhesive layer |
| F25 | second pressure-sensitive adhesive layer |

The invention claimed is:

1. A material roll, comprising:
an optical film;
a first base film disposed on a first surface of the optical film with a first pressure-sensitive adhesive layer interposed between the first surface of the optical film and the first base film; and
a second base film disposed on a second surface of the optical film with a second pressure-sensitive adhesive layer interposed between the second surface of the optical film and the second base film, wherein
an adhesive power A of the first pressure-sensitive adhesive layer at an interface on the first base film side, an adhesive power B of the first pressure-sensitive adhesive layer at an interface on the optical film side, an adhesive power C of the second pressure-sensitive adhesive layer at an interface on the optical film side, and an adhesive power D of the second pressure-sensitive adhesive layer at an interface on the second base film side satisfy the relationships A<B and A<C<D, and
the optical film is wound so that the first base film is on an outer side and the second base film is in an inner side,
wherein the adhesive power A is 0.05 to 0.3 N;
wherein the adhesive power B is 10 to 30 N;
wherein the adhesive power C is 0.3 to 1.5 N; and
wherein the adhesive power D is 2 to 10 N; and
wherein the optical film includes a laminated film including at least one of a polarizing film, a retardation film, and a brightness enhancement film.

2. The material roll according to claim 1, wherein at least one of the first base film and the second base film is made of a polyester-based polymer.

3. The material roll according to claim 2, wherein the polyester-based polymer is polyethylene terephthalate.

4. The material roll according to claim 1, wherein the first base film and the second base film are made of the same material.

5. The material roll according to claim 1, wherein the first base film is a release film and the second base film is a surface protecting film.

6. A method for manufacturing a material roll including an optical film, comprising:
disposing a first base film on a first surface of the optical film, with a first pressure-sensitive adhesive layer interposed between the first surface of the optical film and the first base film;
disposing a second base film on a second surface of the optical film, with a second pressure-sensitive adhesive layer interposed between the second surface of the optical film and the second base film, wherein
an adhesive power A of the first pressure-sensitive adhesive layer at an interface on the first base film side, an adhesive power B of the first pressure-sensitive adhesive layer at an interface on the optical film side, an adhesive power C of the second pressure-sensitive adhesive layer at an interface on the optical film side, and an adhesive power D of the second pressure-sensitive adhesive layer at an interface on the second base film side satisfy the relationships A<B and A<C<D; and
winding the optical film so that the first base film is on an outer side and the second base film is in an inner side,
wherein the adhesive power A is 0.05 to 0.3 N;
wherein the adhesive power B is 10 to 30 N;
wherein the adhesive power C is 0.3 to 1.5 N; and
wherein the adhesive power D is 2 to 10 N.

* * * * *